(12) United States Patent
Lee et al.

(10) Patent No.: US 6,476,900 B1
(45) Date of Patent: *Nov. 5, 2002

(54) LIQUID CRYSTAL DISPLAY

(75) Inventors: Seung Hee Lee, Ich'on (KR); In Cheol Park, Seoul (KR); Hyang Yul Kim, Ich'on (KR); Yun Hee Lee, Seoul (KR)

(73) Assignee: Hyundai Display Technology Inc., Kyoungki-do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/199,001

(22) Filed: Nov. 24, 1998

(30) Foreign Application Priority Data

Dec. 17, 1997 (KR) .............................. 97-70129

(51) Int. Cl.⁷ .............................. G02F 1/1343
(52) U.S. Cl. ...................... 349/141; 349/143
(58) Field of Search ................... 349/141, 143

(56) References Cited

U.S. PATENT DOCUMENTS

| | | | |
|---|---|---|---|
| 5,247,289 A | | 9/1993 | Matsueda ..................... 345/98 |
| 5,459,092 A | | 10/1995 | Kawasaki et al. ............. 437/51 |
| 5,598,285 A | * | 1/1997 | Kondo et al. ................. 349/141 |
| 5,710,606 A | | 1/1998 | Nakajima et al. ............. 349/42 |
| 5,745,207 A | * | 4/1998 | Asada et al. ................. 349/141 |
| 5,754,266 A | | 5/1998 | Ohta et al. ................... 349/139 |
| 5,757,443 A | | 5/1998 | Kobayashi ...................... 349/5 |
| 5,760,857 A | | 6/1998 | Yanagawa et al. ............. 349/43 |
| 5,808,705 A | | 9/1998 | Hishida et al. ................ 349/33 |
| 5,886,762 A | * | 3/1999 | Lee et al. ..................... 349/141 |
| 5,905,556 A | * | 5/1999 | Suzuki et al. ................. 349/141 |
| 5,907,379 A | * | 5/1999 | Kim et al. .................... 349/141 |
| 5,995,182 A | * | 11/1999 | Watanabe et al. ............. 349/110 |
| 6,028,653 A | * | 2/2000 | Nishida ....................... 349/141 |
| 6,069,678 A | * | 5/2000 | Sakamoto et al. ............. 349/141 |
| 6,222,599 B1 | * | 4/2001 | Yoshida et al. ............... 349/106 |

FOREIGN PATENT DOCUMENTS

| | | |
|---|---|---|
| JP | 5-273598 | 10/1993 |
| JP | 6-35417 | 2/1994 |
| JP | 6-324337 | 11/1994 |
| JP | 7-128683 | 5/1995 |
| JP | 7-159811 | 6/1995 |
| JP | 7-270822 | 10/1995 |
| JP | 8-254716 | 10/1996 |
| JP | 8-286208 | 11/1996 |
| JP | 8-313923 | 11/1996 |
| JP | 9-15619 | 1/1997 |
| JP | 9-197443 | 7/1997 |
| JP | 9-230380 | 9/1997 |
| JP | 9-269508 | 10/1997 |
| JP | 10-90708 | 4/1998 |
| JP | 10-170939 | 6/1998 |

\* cited by examiner

*Primary Examiner*—William L. Sikes
*Assistant Examiner*—Tarifur R. Chowdhury
(74) *Attorney, Agent, or Firm*—Ladas & Parry

(57) ABSTRACT

Is disclosed a liquid crystal display having a gate bus line arranged in a first direction on a substrate, a data bus line arranged in a second direction substantially perpendicular to the first direction on the substrate, the data bus line defining a space for an unit pixel of the LCD together with the gate bus line, a counter electrode formed in the unit pixel space of the LCD and having at least three first part extended in the second direction, and a pixel electrode having at least two second parts, the second part extended between the first parts of the counter electrode and disposed in the second direction, the second part slanting to one side of adjacent first parts thereto, so that an intensity of an electric field at one portion of the unit pixel space is different at another portion of the unit pixel space. Accordingly, a color shift of the LCD is prevented.

6 Claims, 2 Drawing Sheets

FIG.1
(Conventional)
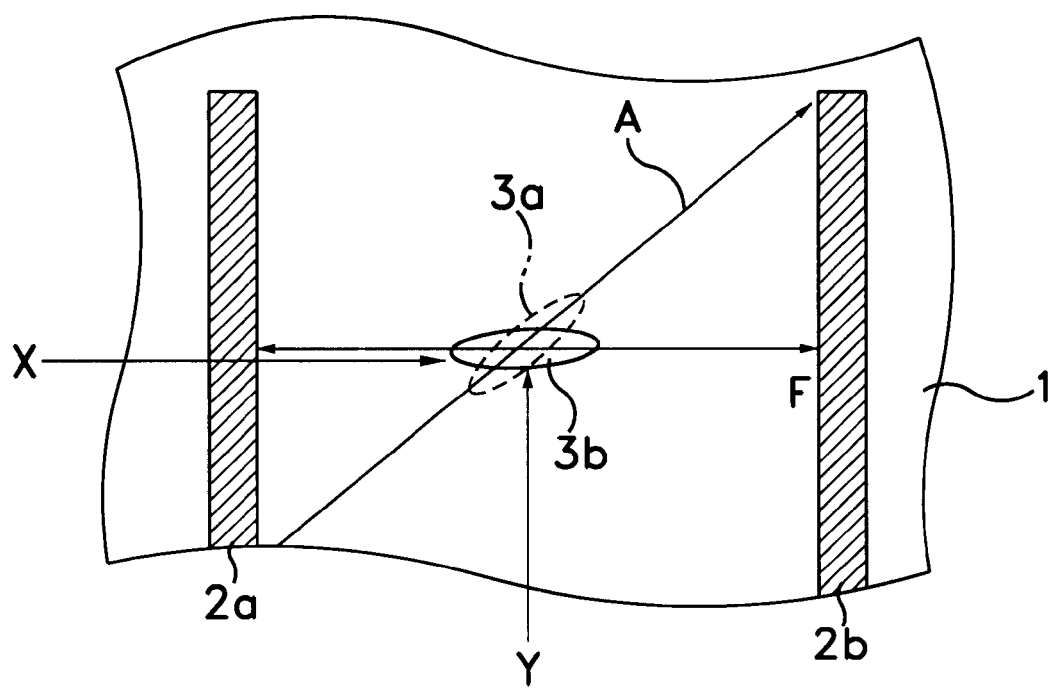

LIQUID CRYSTAL DISPLAY

BACKGROUND

The present invention relates to a technique of liquid crystal display(LCD) capable of preventing a color shift.

In general, an IPS-LCD(In-Plane Switching Liquid Crystal Display) for improving a narrow viewing angle of a TN-LCD (Twisted Nematic Liquid Crystal Display), suggested by Hitachi Cooperation of Japan, has electrodes 2a and 2b disposed on a lower substrate 1, which drive liquid crystal molecule 3a. Therefore, there is generated an electric field parallel to the lower substrates, as shown in FIG. 1.

The IPS-LCD has some problems and one of them is the color shift which will be detailed described. Before the electric field is formed between electrodes, the molecules 3a are arranged along a direction of an alignment layer(not shown) formed on the lower substrate. When the electric field is generated, the liquid crystal molecules rotate and thus are arranged along the electric field F. Major axis of the liquid crystal molecules which have positive dielectric anisotropy is parallel to the electric field while minor axis of the liquid crystal molecules which have negative dielectric anisotropy is parallel to the electric field. Since shape of the liquid crystal molecule is rod form and the length of major axis is different from that of the minor axis, there is an optical anisotropy. Accordingly, there is generated a color variation in the screen of the LCD according to the viewing point. That is, after the electric field is generated, at Y direction the minor axis of the liquid crystal molecule is observed, the screen of the LCD takes a blue color with shorter wavelength than white. At X direction the major axis of the liquid crystal molecule is observed, the screen of the LCD takes a yellow color with longer wavelength than white. Therefore, the picture quality of the LCD is degraded.

SUMMARY

Accordingly, an aim of a present invention is to prevent a color shift in an IPS-LCD, thus improving a picture quality.

In order to accomplish the aim of the present invention, a distance between a pixel electrode and a counter electrode is different among unit pixel space at a portion adjacent to a data bus line and a portion near a center of the unit pixel space such that an intensity of an electric field formed between the pixel electrode and the counter electrode is different at the portion adjacent to the data bus line and the portion near the center of the unit pixel space.

In detail, the LCD of the present invention has a gate bus line arranged in a first direction on a substrate; a data bus line arranged in a second direction substantially perpendicular to the first direction on the substrate, the data bus line defining a space for an unit pixel of the LCD together with the gate bus line; a counter electrode having a first part formed in the unit pixel space and extended in the second direction, the first part being at least three; and a pixel electrode having a second part extended between the first parts of the counter electrode and disposed in the second direction, the second part being at least two and slanting to one side of adjacent first parts thereto. In an embodiment, the counter electrode further comprises a pair of third parts for connecting ends of the first parts of the counter electrode, the third part extended in the first direction and being a rectangular frame. In another embodiment, the pixel electrode further comprises a pair of fourth parts for connecting ends of the second parts, the fourth part extended in the first direction and overlapped with the third part. In one embodiment, the second part is slanted to the first part adjacent to the data bus line among at least three-first parts and in another embodiment the second part is slanted to the first part adjacent to the center of the unit pixel space among at least three-first parts.

In another view, the LCD comprises an upper substrate and a lower substrate opposite thereto, liquid crystal molecules interposed therebetween; a gate bus line arranged in a first direction on the lower substrate; a data bus line arranged in a second direction substantially perpendicular to the first direction on the substrate, the data bus line defining a space for an unit pixel of the LCD together with the gate bus line; a counter electrode formed in the unit pixel space of the LCD and a rectangular frame shape, the counter electrode having at least one bar for dividing an inside of the frame; and a pixel electrode formed in the unit pixel space where the counter electrode is formed, the pixel electrode having a first part and second part each overlapped with one pair of opposite sides of the frame and a third part for connecting the first part and the second part, the third part being at least two and parallel to the bar of the counter electrode, the third part, between the bar of the counter and the other pair of opposite sides of the frame, slanting to one side among them. Here, the bar of the counter electrode and the third part of the pixel electrode are parallel to the data bus line. The liquid crystal molecule has a positive or a negative dielectric anisotropy. The product of a distance between the upper substrate and the lower substrate and an index of refraction anisotropy is about 0.2 $\mu$m to about 0.6 $\mu$m.

From the above mentioned LCD, an electric field of a certain portion among the unit pixel space is stronger than that of other portion, so a rotation angle of liquid crystal molecule is different at these portions. Accordingly, an optical isotropy of liquid crystal is compensated and thus the color shift is prevented.

BRIEF DESCRIPTION OF THE ATTACHED DRAWINGS

FIG. 1 shows an operation of an IPS-LCD according to the conventional art.

DESCRIPTION OF THE EMBODIMENT

Figure 2:
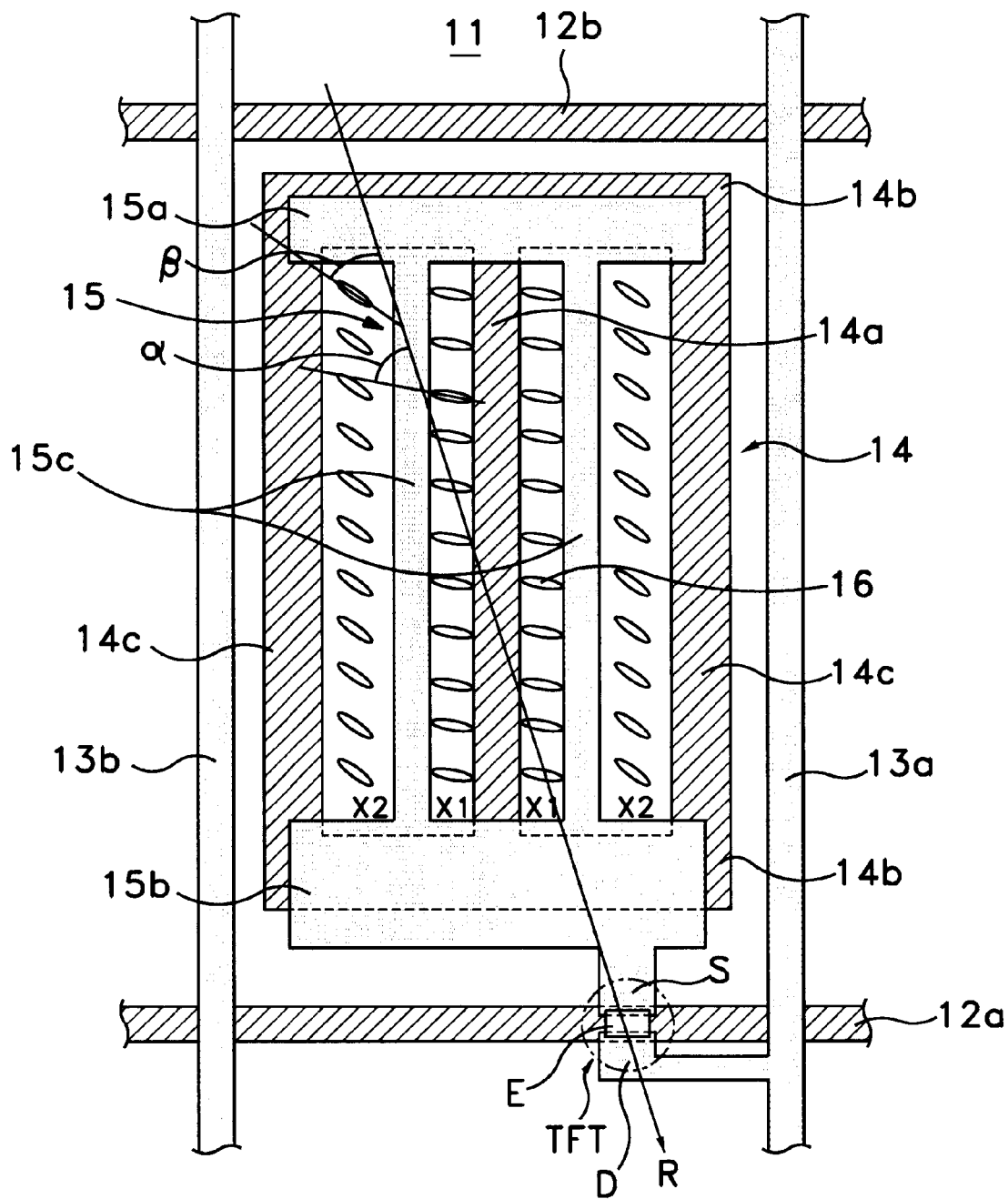
FIG. 2 shows a cross sectional view of LCD for preventing a color shift according to the present invention.

A plurality of gate bus lines (12a, 12b) and a plurality of data bus lines (13a, 13b) are disposed on a lower insulating substrate 11 in matrix shape, thus defining a space for unit pixel. In FIG. 2, a pair of gate bus lines and a pair of data bus lines are shown. There is a gate insulating layer (not shown) between the gate bus line and the data bus line for insulating them. The data bus line and the gate bus line are made of opaque metal with good conductivity.

At the intersection of the gate bus line 12a and the data bus line 13a is formed a thin film transistor (TFT). The TFT includes the gate bus line 12a, a channel layer(not shown) formed on the gate bus line and an etch stopper(E), and a source electrode S and a drain electrode D which are overlapped with the both side of the etch stopper. The drain electrode D is an electrode line extended from the data bus line 13a and the source electrode S is an electrode line extended from a pixel electrode which will be explained.

A counter electrode 14 is located at the unit pixel space. The counter electrode 14 is a rectangular frame shape and includes at least one bar 14a for dividing the inside of the frame of the counter electrode 14. In the present embodiment, the bar 14a is one. A width of a portion 14b of the counter electrode 14 which is adjacent to the gate bus lines 12a and 12b may be larger than that of a portion 14c which is adjacent to the data bus lines 13a and 13b. The width of the bar 14a may be equal to that of the portion 14c. Here, the counter electrode 14 is connected to another counter electrode(not shown) of the adjacent unit pixel, so all the counter electrodes of the LCD receive the common signal. The counter electrode 14 is made of material same to the gate bus lines 12a and 12b and is formed on the lower substrate 11 together with the gate bus lines 12a and 12b.

The pixel electrode 15, for driving the liquid crystal molecule 16 together with the counter electrode 14 is also arranged at the unit pixel space. The pixel electrode 15 includes a first part 15a and a second part 15b which are overlapped with the portion 14b of the counter electrode 14, with interposing the gate insulating layer(not shown) therebetween and at least one third part 15c for connecting the first part 15a and the second part 15b. The third part 15c is parallel to the date bus line 13a, 13b and at least two. Preferably, the number of the third part 15c is much than the bar 14a of the counter electrode 14 by one. In the present embodiment, the number of the third part 15c is two. The first part 15a and the second part 15b are parallel to each other. The third part 15c is disposed between the portion 14c and the bar 14a of the counter electrode 14 and slanted to the bar 14a than to the portion 14c of the counter electrode 14. In another embodiment, the third part 15c can be slanted to the portion 14c of the counter electrode 14 than the bar 14a. That is, the third part 15c is not located in a middle portion of the portion 14a and the bar 14a of the counter electrode 14 but slantly located to one side thereof. In the LCD, an effective parts for driving the liquid crystal molecules are the bar 14a and the portion 14c of the counter electrode 14 and the third part 15c parallel to the data bus lines 13a and 13b. The portion 14b of the counter electrode 14 and the first part 15a and the second part 15b of the pixel electrode 15 which overlap with the portion 14b form an auxiliary capacitor. The second part 15b of the pixel electrode adjacent to the gate bus line 12a for selecting the corresponding the unit pixel is toward the TFT and forms the source electrode S. A space between the third part 15c and the bar 14a is represented by the first space X1 and a space between the third part 15c and the portion 14c of the counter electrode 14 parallel to the data bus lines 13a and 13b is represented by the second space X2.

On the above described lower substrate 11 is provided an alignment layer(not shown) which is rubbed such that the ideal rubbing angle is ±45° with respect to the gate bus lines 12a and 12b and the data bus lines 13a and 13b. A character R in the drawing stands for the rubbing direction. In the present embodiment, a horizontal alignment layer is used. The ideal rubbing direction forms ±45° with respect to the gate bus lines 12a and 12b and the data bus lines 13a and 13b. However, actually the angle between the rubbing axis and the data bus line 13a or 13b is less ±45°, preferably about 120° to 150° in case of positive dielectric anisotropy. Also, when liquid crystal molecule with the negative dielectric anisotropy is used, the angle between the rubbing axis and the data bus line 13a or 13b is preferably about 750° to 780°. A pretilt angle of the horizontal alignment layer is about 1 to 1.5°. On the rear surface of the lower substrate is attached a polarization film(not shown). The polarized axis of the lower polarization film coincides to the rubbing axis of the lower substrate. A upper polarization film(not shown) attached to the upper substrate is across with respect to the rubbing axis of the lower substrate.

The liquid crystal molecules are initially aligned along the rubbing direction R before no voltage is applied to the counter electrode 14 and the pixel electrode 15. Thereafter, the gate bus line is selected, the voltage is applied to the data bus line 13a and the voltage of the data bus line 13a is applied to the pixel electrode, so the electric field is generated between the counter electrode 14 and the pixel electrode 15, the first space X1 and the second space X2. As shown in FIG. 2, since the distance of the first space X1 is narrower than that of the second space X2, the electric field at the first space X1 is relatively stronger and the electric field at the second space X2 is relatively weaker ($E=V/d$, wherein E is electric field, V is voltage and d is distance).

As shown in FIG. 2, the liquid crystal molecules are arranged along the stronger electric field in the first space X1, so the angle a between the initial alignment direction and the arrangement of the liquid crystal molecule under the electric field is about 45° in ideal state. However, the rotation angle $\alpha$ can be less 45° according to an alignment condition, the pretilt angle and so on. On the other hand, the weaker electric field is generated in the second space X2 and the liquid crystal molecules are arranged along the weaker electric field. Therefore, the rotation angle $\beta$ between the initial alignment direction and the arrangement of the liquid crystal molecule under the weaker electric field is less 45° shorter than $\alpha$ in ideal state.

As described above, dual domain is formed in the unit pixel without rubbing process. In detail, formed in the unit pixel, the electric field is partially different in location and the rotation angle of the liquid crystal molecule becomes different. Accordingly, though only the minor axis of the liquid crystal molecule in a domain is viewed in a certain position, since in adjacent domain there is the major axis of the liquid crystal molecule, the optical anisotropy is compensated and thus the color shift is prevented.

Though the explanation is excluded in the present embodiment, the LCD further comprises a upper substrate opposite to the lower substrate on which a color filter is formed and liquid crystal layer interposed between the lower substrate and the upper substrate. For preventing the color shift, a product of the distance between the upper substrate and the lower substrate and an index of refraction isotropy is preferably about 0.2 $\mu$m to about 0.6 $\mu$m. The alignment layer is formed on the opposite surface of the upper substrate and the lower substrate and the alignment angle thereof has about 180° difference.

According to the present invention, since the distance between the counter electrode and the pixel electrode in a certain portion of the unit pixel is differently designed from in another certain portion, the rotation angle of the liquid crystal molecule is different according to the domain. The arrangement of the liquid crystal molecule under the electric field is partially different, so the optical anisotropy is compensated and the color shift of the IPS-LCD is prevented.

What is claimed is:

1. A liquid crystal display (LCD) comprising:
   an upper substrate and a lower substrate opposite thereto, liquid crystal molecules interposed therebetween;
   a gate bus line arranged in a first direction on the lower substrate;
   a data bus line arranged in a second direction substantially perpendicular to the first direction on the lower substrate, the data bus line defining a space for an unit pixel of the LCD together with the gate bus line;
   a counter electrode having a rectangular frame formed in the unit pixel space of the LCD, the counter electrode having a first pair of opposing sides extending in the second direction and a second pair of opposing sides extending in the first direction, the counter electrode further having at least one bar for dividing an inside of the rectangular frame; and a pixel electrode formed in the unit pixel space where the counter electrode is formed, the pixel electrode having a first part and second part each overlapping the first pair of opposing sides of the rectangular frame of the counter electrode and a third part for connecting the first part and the second part, the third part comprising at least two bars parallel to the at least one bar of the counter electrode, the pixel electrode bars located at between the at least one bar of the counter electrode and the first pair of opposite sides of the rectangular frame of the counter electrode;

wherein a distance between the first pair of opposing sides of counter electrode comprising the rectangular frame and the third part of the pixel electrode is different from that between the at least one bar of the counter electrode and the third part of the pixel electrode.

2. The LCD according to claim 1, wherein the at least two bars of the pixel electrode are disposed closer to the first pair of opposing sides of the rectangular frame of the counter electrode than to the at least one bar of the counter electrode.

3. The LCD according to claim 1, wherein the at least two bars of the pixel electrode are disposed closer to the at least one bar of the counter electrode than to the first pair of opposite sides of the rectangular frame of the counter electrode.

4. The LCD according to claim 1, wherein the at least one bar of the counter electrode and the at least two bars of the pixel electrode are parallel to the data bus line.

5. The LCD according to claim 1, wherein the liquid crystal molecule has a positive or a negative dielectric anisotropy.

6. The LCD according to claim 1, wherein a product of a distance between the upper substrate and the lower substrate and an index of refraction anisotropy is 0.2 $\mu$m to 0.6 $\mu$m.

* * * * *